Jan. 9, 1951      M. C. LARSON      2,537,469
NUT LOCK
Filed April 19, 1948
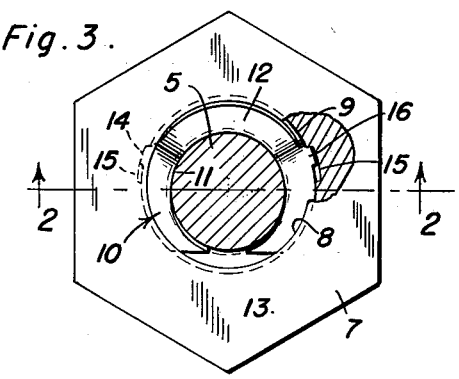
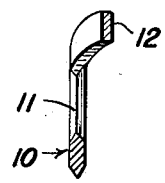
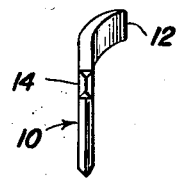
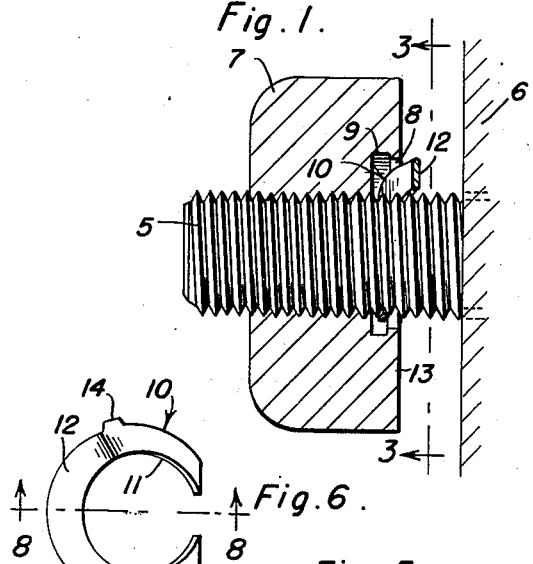
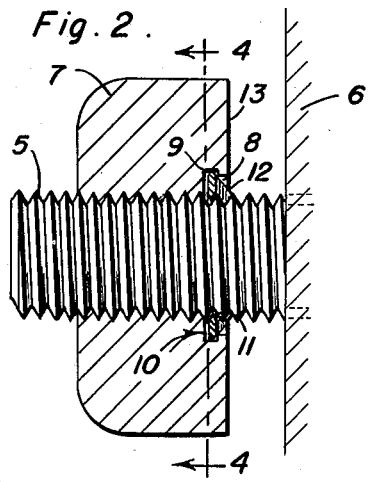
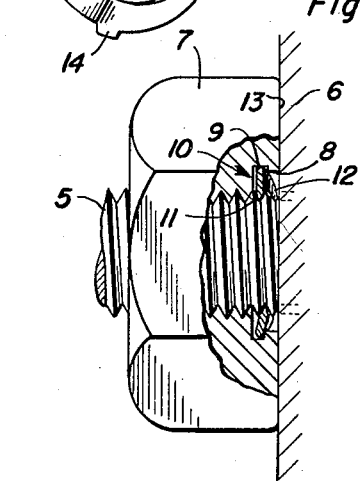
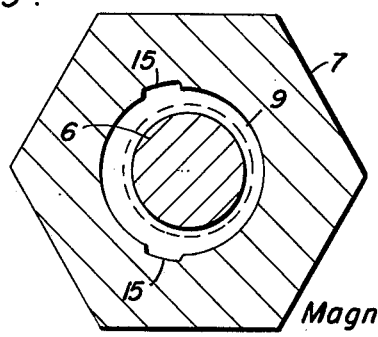
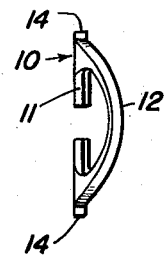
Magnus C. Larson
INVENTOR.
BY *Clarence A. O'Brien*
*and Harvey B. Jacobson*
Attorneys Patented Jan. 9, 1951

2,537,469

UNITED STATES PATENT OFFICE 2,537,469

NUT LOCK

Magnus C. Larson, Philadelphia, Pa.

Application April 19, 1948, Serial No. 21,939

1 Claim. (Cl. 151—25)

This invention relates to nut locks, and the primary object of the invention is to provide novel means whereby an interlocking action between the bolt and the nut thereon will be obtained which will increase as the nut is screwed to its seat.

The present invention includes a split ring carried by a nut and having an offset intermediate portion projecting beyond a face of the nut and adapted to be flattened when the nut is screwed to its seat, so that the inner periphery of the ring will be forced into locking engagement with the bolt thread.

The exact nature of the present invention, as well as more specific objects and features thereof, will become apparent from the following description when considered in connection with the accompanying drawings, in which:

Figure 1 is a fragmentary sectional view showing a nut partly threaded onto a bolt and provided with a split ring in accordance with the present invention, the nut being in unlocked relation to the bolt;

Figure 2 is a view similar to Figure 1, taken on line 2—2 of Figure 3;

Figure 3 is a transverse section taken on line 3—3 of Figure 1, and partly broken away and in section;

Figure 4 is a transverse section taken on line 4—4 of Figure 2;

Figure 5 is a view somewhat similar to Figure 1, with the nut in locked engagement relative to the bolt and screwed to its seat;

Figure 6 is a plan view of the ring carried by the nut shown in Figures 1 to 5 inclusive;

Figure 7 is a view of said ring looking toward the right of Figure 6;

Figure 8 is a section taken on line 8—8 of Figure 6;

Figure 9 is a side view of the ring.

Referring in detail to the drawing, 5 indicates a bolt extending through a member 6 and having a nut 7 threaded thereon.

The nut has the usual threaded bolt opening and is provided with an undercut recess 8 in one face thereof about said bolt opening, the undercut portion of the recess being indicated at 9. A split flexible resilient ring or washer 10 is disposed in and has its outer edge normally engaging the annular wall of the undercut portion 9 of recess 8, the inner edge of the ring being normally disposed to have the bolt 5 freely thread through the same as will be apparent from Figure 2. As shown, the ring preferably has a spiral thread-engaging inner edge 11 which may be produced by cutting the thread on this edge or giving the ring a spiral form. As shown clearly in several of the views, the ring 10 is provided with an offset intermediate portion 12 which normally projects outwardly beyond the face 13 of the nut which is adapted to seat against the member 6. The arrangement is such that when the nut is screwed to its seat, the offset portion 12 is brought into engagement with the member 6 and flattened so that the ends of the ring move toward each other and the inner edge of the ring is forced into locking engagement with the bolt thread as shown in Figure 5.

The recess is preferably eccentric to the bolt opening of the nut as clearly shown in Figure 4, in which case the ring is preferably of substantially crescent shape as more clearly shown in Figure 6, with the ring tapering narrower toward its ends. The ring is adapted to be disposed with its wider intermediate portion coincident with the wider portion of the bottom wall of recess 8. and to insure this, the ring is provided at opposite sides with spaced positioning lugs 14 slidably engaging in elongated grooves 15 provided in the wall of the undercut portion 9 of recess 8, said positioning lugs normally contacting the walls at corresponding ends of said grooves. It will be apparent that flattening of the intermediate portion 12 tends to increase the diameter of ring 10, but this is prevented by the engagement of the outer edge of the ring with the wall of undercut recess portion 9 so that radial contraction of the ring is effected to bring about the forcing of the inner edge of the ring into locking engagement with the bolt thread. This action is accentuated by reason of the fact that the end portions of the ring move into narrower portions of the recess when the intermediate portion 12 is flattened. As the ends of the ring are normally spaced a considerable distance apart, it is possible to forcibly contract the ring for initially introducing it within the recess. After this is accomplished by suitable means, the ring is released so that it returns to its normal expanded condition to contact the wall of the undercut recess portion 9 and to engage the lugs 14 in the grooves 15. In this way, the ring is effectively maintained in assembled relation to the nut. It is also pointed out that the outer edge of the intermediate portion 12 is formed on the arc of a smaller circle than that on which the outer edges of the end portions of the ring are formed, thus permitting said intermediate portion 12 to project outwardly through the smaller portion of recess 8.

From the foregoing description, it is believed that the construction, operation and advantages of the present invention will be readily understood and appreciated by those skilled in the art. Modifications and minor changes are contemplated within the spirit and scope of the invention as claimed.

Having described the invention, what is claimed as new is:

In a nut lock, a nut having a threaded bolt opening and provided with an undercut recess in one face thereof about said bolt opening, and a split flexible resilient ring having its end portions disposed in the undercut portion of said recess, the outer edges of said end portions normally engaging the annular wall of said undercut portion of the recess, the inner edge of said ring being normally disposed to have a bolt freely threaded through the same and having a spiral thread engaging inner edge, said ring being provided with an offset intermediate portion which normally projects outwardly beyond said face of the nut and is adapted to be pressed into the recess when the nut is screwed to its seat to move the ends of the ring toward each other to cause the inner edge of the ring to be forced into locking engagement with the bolt thread.

MAGNUS C. LARSON.

REFERENCES CITED

The following references are of record in the file of this patent:

UNITED STATES PATENTS

| Number | Name | Date |
| --- | --- | --- |
| 778,537 | Fewget | Dec. 27, 1904 |
| 860,758 | Morey | July 23, 1907 |
| 1,555,576 | Hokanson | Sept. 29, 1925 |
| 1,795,570 | Nilson | Mar. 10, 1931 |
| 2,125,323 | Tarwater | Aug. 2, 1938 |